(No Model.)

A. J. ROSENTRETER.
PNEUMATIC TIRE.

No. 506,550. Patented Oct. 10, 1893.

Witnesses.
F. B. Hutchinson
Chas. R. Osgood.

Inventor.
Albert J. Rosentreter,
per R. F. Osgood,
Atty.

UNITED STATES PATENT OFFICE.

ALBERT J. ROSENTRETER, OF ROCHESTER, NEW YORK, ASSIGNOR OF ONE-HALF TO EDWARD SCHIRCK, OF SAME PLACE.

PNEUMATIC TIRE.

SPECIFICATION forming part of Letters Patent No. 506,550, dated October 10, 1893.

Application filed July 11, 1892. Serial No. 439,718. (No model.)

*To all whom it may concern:*

Be it known that I, ALBERT J. ROSENTRETER, of Rochester, in the county of Monroe and State of New York, have invented a certain new and useful Improvement in Pneumatic Tires, of which the following is a specification.

My improvement relates to that class of pneumatic tires in which separate inflatable sections are placed inside the main tire and a chamber is provided extending the whole circuit of the tire, through which air is forced to inflate the sections. Such devices are already known.

My invention consists in the construction and arrangement of parts hereinafter described and claimed.

Figure 1:
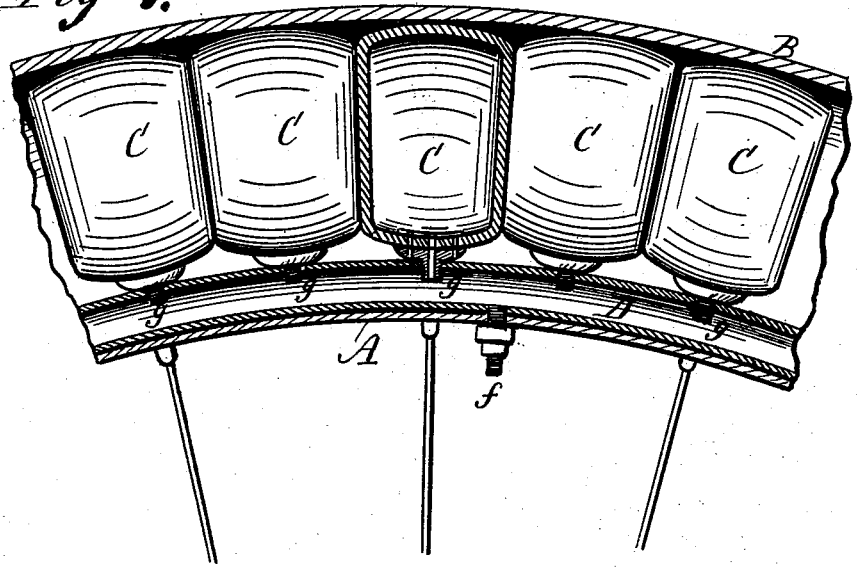
Figure 2:
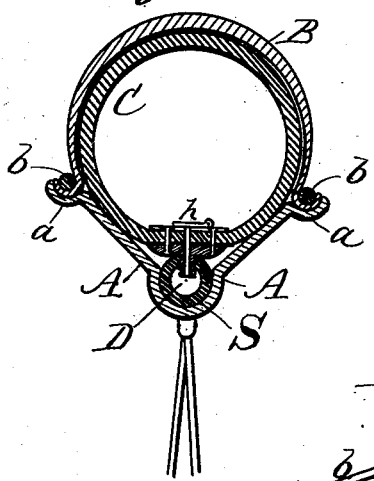
Figure 3:
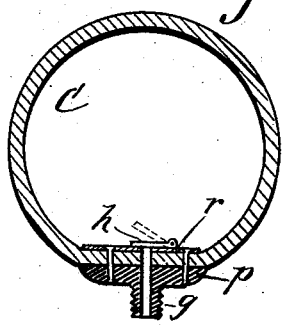
Figure 4:
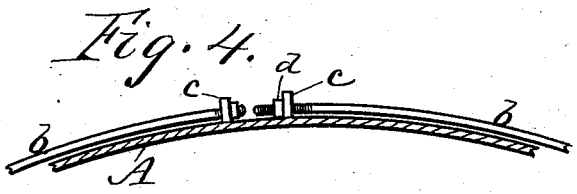

In the drawings, Figure 1 is a longitudinal, vertical section, partially in elevation, of a portion of a bicycle tire and rim showing my invention. Fig. 2 is a cross section of the same. Fig. 3 is an enlarged cross section of the pneumatic tire, showing one of the inflatable sections and the nozzle attached thereto. Fig. 4 is an elevation of the meeting ends of the tightening wire that holds the cushion to the rim of the wheel.

A indicates the rim or felly of the wheel and B, the exterior cushion or covering.

C C indicate the inflatable sections placed inside the cushion, said sections being made of rubber, and hollow, for the purpose of receiving air under pressure and holding it to give elasticity to the wheel.

D is an independent hollow tube resting inside the rim or felly A, extending around the whole circuit of the wheel, and connected with the separate inflatable sections C C by nozzles $g$ $g$, by which means when air is forced into the tube under pressure it is also forced into all of the sections C, C. Each of these sections C C has a check valve $h$ to hold the air independently of the others and also of the supplying tube. The tube D is provided at one point with a nozzle $f$, to which an air pump can be attached for forcing air into the tube.

The cushion B is attached to the rim or felly by fitting its edges into half circular seats $a$ $a$ in the edges of the latter, and binding them in place by wires $b$ $b$, which extend around the whole circuit of the rim. The ends of the wires pass through lugs $c$ $c$ of the rim and are tightened in place by nuts $d$ $d$, as shown in Fig. 4.

In order to furnish a broad bearing for the attachment of the base of the sections C C to the filling tube D, each of said sections is provided on its under side with a flat seat $p$, of which the nozzle $g$ forms a part, and also on its inside with a flat stiffener $r$, and these parts are riveted through the intervening thickness of the section as shown in Fig. 3. By this means the body of the section at that point is flattened and a broad base is secured, which is necessary to resist the great strain which comes on the sections in travel, as well as to prevent cramping of the valve inside of the sections. By this means also double riveting can be used. To accommodate this form of the connection the rim or felly A is constructed with a deep groove or channel $s$ on its inner side, to receive the tube, which latter is seated therein and has a firm bearing, which is essential to prevent strain on the couplings. Heretofore, in this class, where an air chamber or passage for supplying the sections has extended around the wheel, it has been made open on the side next to the inflatable sections, and no adequate support has been given to the latter, as their sides only come in contact with the sides of the rim, leaving the center unsupported; besides which it is difficult to so pack the chamber that it will not leak under great pressure. In contradistinction to such devices this invention embodies a solid tube with supporting connections at the center for holding the sections.

Having described my invention I do not claim the combination, with a wheel rim and a tire casing, of separate inflatable sections contained within the casing, and a tube located in the rim and having a separate connection with each inflatable section.

What I claim as new, and desire to secure by Letters Patent, is—

The combination, with the rim A and inflatable sections C C, of the air tube D located inside the rim, the seat $p$ provided with the nozzle $g$, and the stiffener $r$ attached to the sections, and forming a direct connection with the tube, as shown and described and for the purpose specified.

In witness whereof I have hereunto signed my name in the presence of two subscribing witnesses.

ALBERT J. ROSENTRETER.

Witnesses:
R. F. OSGOOD,
CHAS. A. WIDENER.